R. B. JAMES & E. B. CRUMP.
RAT TRAP.
APPLICATION FILED JAN. 29, 1913.
1,097,642.
Patented May 26, 1914.
2 SHEETS—SHEET 2.
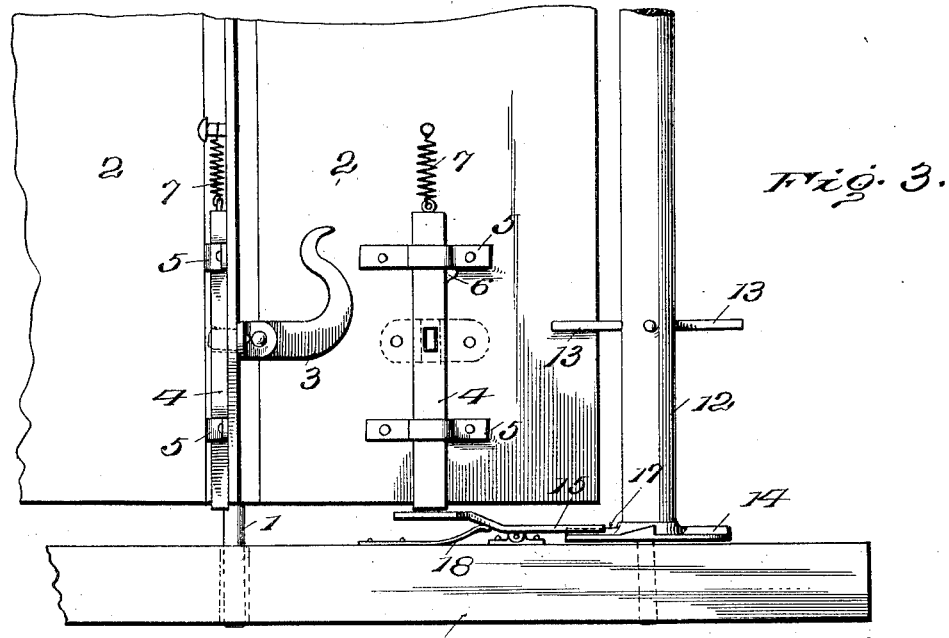
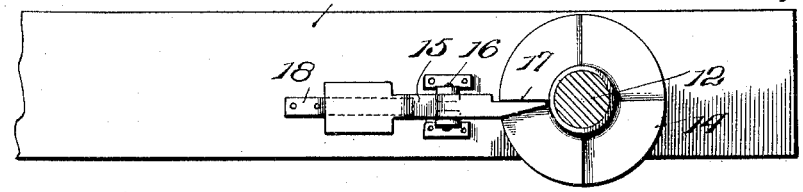
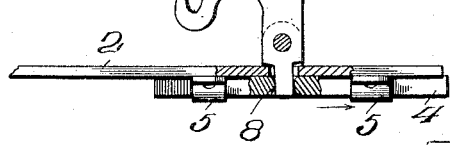
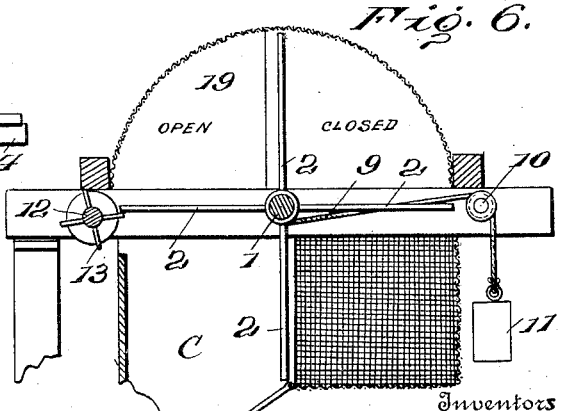

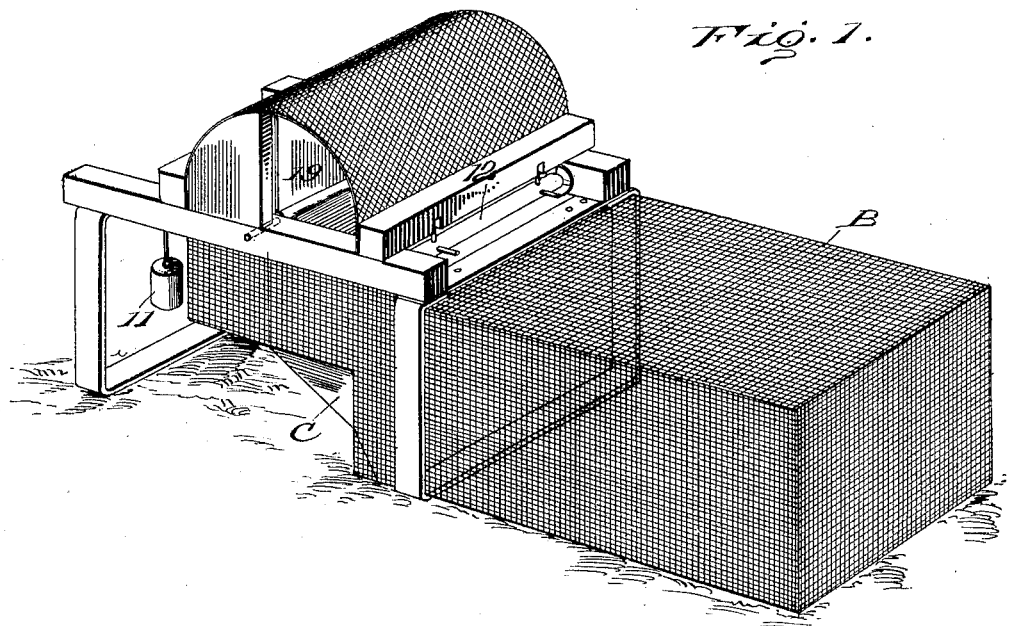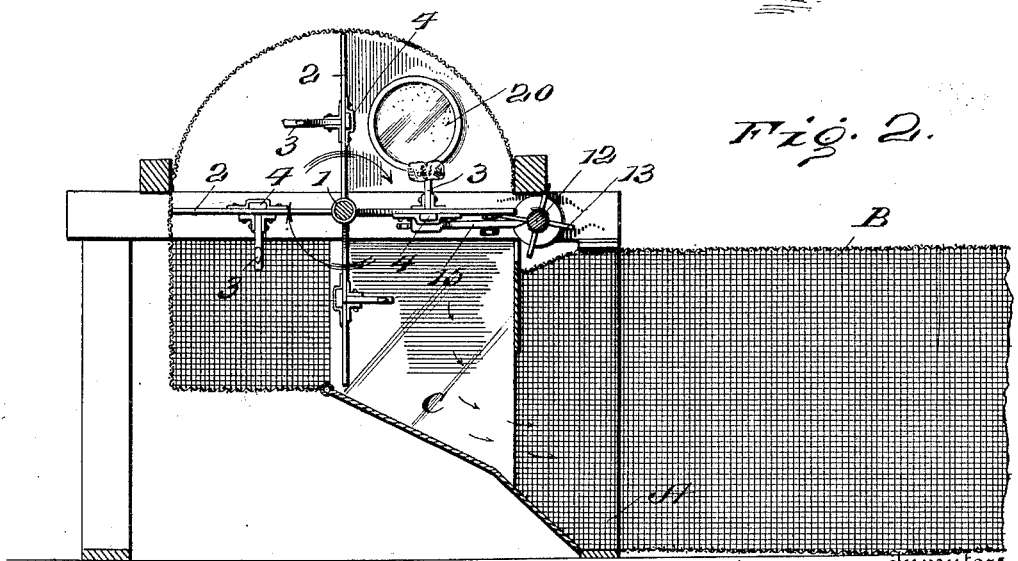

UNITED STATES PATENT OFFICE.

RUTHERFORD B. JAMES AND EDWARD BRYANT CRUMP, OF ELLSWORTH, ILLINOIS.

RAT-TRAP.

1,097,642.  Specification of Letters Patent.  Patented May 26, 1914.

Application filed January 29, 1913. Serial No. 744,878.

*To all whom it may concern:*

Be it known that we, RUTHERFORD B. JAMES and EDWARD BRYANT CRUMP, citizens of the United States, residing at Ellsworth, in the county of McLean and State of Illinois, have invented certain new and useful Improvements in Rat-Traps, of which the following is a specification.

Our invention relates to improvements in rat traps and the object is to provide a shaft having a plurality of wings which are held against movement by suitable means and said means engaging each wing during the rotation of the shaft so that the shaft rotates only the distance of one wing. Bait triggers are mounted upon the wings and when actuated operate mechanism which releases the wings from the holding means so that the wing upon which the trigger has been actuated will be lowered and another wing will take its place. The lower end of the wing carries the rat or animal into the cage from which cage the animal can be removed and disposed of.

The invention consists of certain novel features of construction and combinations of parts which will be hereinafter more fully described and pointed out in the claims.

In the accompanying drawings—Figure 1 is a perspective view of the invention; Fig. 2 is a vertical sectional view; Fig. 3 is a bottom plan view of one of the wings showing the mechanism which holds the wing against movement; Fig. 4 is a cross sectional view showing the mechanism for releasing the holding shaft; Fig. 5 is a detail sectional view of the wing and tripping bar, showing the connection between the bar and trigger; Fig. 6 is a cross sectional view showing the means for rotating the wings.

A represents the frame which has a wire netting or cage B fastened thereto for the reception of the rats, and animals. A hopper C is supported from the frame and extends beneath the frame forming a closure for one end of the cage B.

A wing shaft 1 is journaled in the frame and is provided with wings 2, 2, and each wing is provided with a bait trigger 3 which is pivotally mounted upon the wing and projects through the wing. A tripping bar 4 is slidably mounted upon each wing and is supported in brackets 5, 5. A shoulder 6 is formed on the bar for limiting its movement in one direction. A spring 7 is connected to each bar tending to draw the bar against one of the brackets causing the shoulder 6 to engage the bracket 5 so that the bar is always under spring tension.

The trigger 3 passes through a slot 8 in the bar so that upon the actuation of the trigger, the bar moves against the tension of the spring and in a direction opposed to the action of the spring.

A rope or cable 9 is wound upon the wing shaft 1 and extends along the frame A and over a pulley 10 and has connected thereto a weight 11. A holding or locking shaft 12 is journaled in the frame A and is provided with a plurality of pins 13, 13, which engage the under side of the wing for holding the wing in a horizontal plane. A notched disk 14 is connected to the shaft and engaging the disk is a lever 15 which is fulcrumed at 16 to the frame A. One end of the lever is adapted to engage a notch 17 of the disk for holding the shaft, and the disk 14 is provided with the same number of notches as there are wings, and as we have disclosed only four wings there are only four notches in the disk so that the holding or locking shaft will make a quarter turn the same as is true of the wing shaft so that each wing will be caught and held upon the rotation of the wing shaft of a quarter of a revolution.

A spring 18 presses an end of the lever against the disk so that the lever is always in engagement with one of the notches.

The rat or other animal will enter the trap through the opening 19. A mirror 20 is located on the opposite side or end of the frame for attracting the rat to come onto the wing or platform 2 and as the bait trigger 3 is provided with suitable bait, the animal, in endeavoring to remove the bait from the trigger, will cause the trigger to be oscillated thereby operating the tripping bar 4. The bar will press against an end of the lever 15 causing the lever to be disengaged from a notch of the disk 14 of the locking or holding shaft 12 thereby allowing the wing to move downward carrying the animal with it and discharging the animal into the cage, B.

The weight 11 tends to rotate the shaft in a direction for causing the wings to move to discharge the animal into the cage upon the release of the wing and it is only necessary to produce the slightest tripping action for causing the release of the wing, and it is not dependent upon the weight of the animal upon the wing which causes the wing to move for carrying the animal down and discharging it into the cage.

As the wing passes or is released from the locking shaft, the lever 15 will again engage the disk 14 and will come into contact with the next projecting notch and in sufficient time to catch and lock the next wing as it moves downward. The tripping bar being under spring tension returns to its normal position immediately after coming in contact with the lever, which lever releases the holding shaft.

Having fully described our invention, what we claim as new and desire to secure by Letters Patent is—

1. In a rat trap, the combination with a frame and cage, of a rotatable shaft mounted on the frame having wings, locking means mounted on the frame adapted to engage a wing for holding the wings and shaft against rotation, a lever engaging said locking means for holding the shaft against movement, a movable bar mounted on each wing adapted to engage the lever for releasing the locking means, and a bait trigger on each wing adapted to actuate said movable bar whereby the locking means will be released and the wings allowed to move until the next wing comes into engagement with the locking means.

2. In a rat trap, the combination with a frame having a cage, of a rotatable shaft mounted on the frame having wings, a locking shaft for engaging the wings for holding the wings against movement, a notched disk mounted on the locking shaft, a pivoted lever on the frame engaging the disk and normally holding the shaft against movement, a movable bar mounted on each wing adapted to engage the lever for releasing the locking shaft, and bait triggers pivotally mounted upon each wing and in engagement with the movable bar whereby upon the actuation of the bait trigger the lever will be operated for releasing the locking shaft and permitting the engaged wing to move beyond it.

In testimony whereof we affix our signatures, in the presence of two witnesses.

RUTHERFORD B. JAMES.
EDWARD BRYANT CRUMP.

Witnesses:
 EDNA MOORE,
 RUTH WILDER.

Copies of this patent may be obtained for five cents each, by addressing the "Commissioner of Patents, Washington, D. C."